US012677763B2

(12) United States Patent
Hummel

(10) Patent No.: US 12,677,763 B2
(45) Date of Patent: Jul. 14, 2026

(54) TREE STABILIZER AND A METHOD OF USING THE SAME

(71) Applicant: Curt Hummel, Cypress, TX (US)

(72) Inventor: Curt Hummel, Cypress, TX (US)

( * ) Notice: Subject to any disclaimer, the term of this patent is extended or adjusted under 35 U.S.C. 154(b) by 0 days.

(21) Appl. No.: 18/940,596

(22) Filed: Nov. 7, 2024

(65) Prior Publication Data

US 2025/0081898 A1      Mar. 13, 2025

Related U.S. Application Data

(63) Continuation of application No. 18/093,695, filed on Jan. 5, 2023, now abandoned, which is a continuation-in-part of application No. 14/528,428, filed on Oct. 30, 2014, now abandoned.

(51) Int. Cl.
A01G 17/14 (2006.01)

(52) U.S. Cl.
CPC .................................... A01G 17/14 (2013.01)

(58) Field of Classification Search
CPC .......... A01G 9/12; A01G 9/124; A01G 17/04; A01G 29/00; A01G 17/10; A01G 2017/065; A01G 13/0237; A01G 31/02; A01G 25/02; A01G 9/122; A01G 17/14; F16M 13/02; F16M 11/041
USPC ....... 47/47; 248/218.4, 219.1, 223.41, 224.8, 248/227.3, 229.16
See application file for complete search history.

(56) References Cited

U.S. PATENT DOCUMENTS

| | | | |
|---|---|---|---|
| 1,942,975 A | 1/1934 | Polgar | |
| 2,134,242 A | 10/1938 | Wade | |
| 2,607,623 A | 8/1952 | Lippert | |
| 3,010,256 A | 11/1961 | Ise | |
| 3,165,863 A | 1/1965 | Duran | |
| 3,526,056 A | 9/1970 | Stropkay | |
| 4,235,561 A | 11/1980 | Peterson | |
| 4,453,343 A | 6/1984 | Grimes, Sr. | |
| 4,480,403 A | 11/1984 | Williams | |
| 4,697,952 A | 10/1987 | Maddock | |
| 4,740,104 A | 4/1988 | Stohr et al. | |
| 4,745,706 A | 5/1988 | Muza et al. | |
| 4,773,808 A | 9/1988 | Fischer et al. | |
| 4,922,653 A | 5/1990 | Stone | |
| 4,930,934 A | 6/1990 | Adkins | |
| 5,170,729 A | 12/1992 | Benner | |
| 5,172,515 A | 12/1992 | Lapshansky, Sr. et al. | |
| 5,310,281 A | 5/1994 | Elena | |
| 5,435,097 A | 7/1995 | Harper | |
| 5,446,993 A | 9/1995 | Cullen | |
| 5,463,973 A | 11/1995 | Tait | |
| 5,473,839 A | 12/1995 | Stidham | |

(Continued)

FOREIGN PATENT DOCUMENTS

| | | |
|---|---|---|
| EP | 0539997 A1 | 5/1993 |
| EP | 0805929 A1 | 11/1997 |

(Continued)

*Primary Examiner* — Zoe Tam Tran

(74) *Attorney, Agent, or Firm* — Thompson Patent Law Offices PC

(57) ABSTRACT

A tree stabilizer assembly including a receiver tube, tube base, bar extension with holes, large strap base, snap-in pin, large strap for the tree base, T-post strap, and T-post clamp. The large strap for the tree base couples the assembly to a tree. The tube base is configured to receive a portion of the receiver tube.

13 Claims, 11 Drawing Sheets

1000

(56)                References Cited

U.S. PATENT DOCUMENTS

| 5,542,210 | A  | * | 8/1996 | Hupfl | A01G 9/12 |
| | | | | | 47/47 |
| 5,761,846 | A | | 6/1998 | Marz | |
| 5,795,100 | A | | 8/1998 | Thomas et al. | |
| 5,881,495 | A | | 3/1999 | Clark | |
| 5,924,240 | A | | 7/1999 | Harrison | |
| 5,975,797 | A | | 11/1999 | Thomas et al. | |
| 6,202,977 | B1 | | 3/2001 | Chapman | |
| 6,453,607 | B1 | | 9/2002 | Dewey | |
| 6,540,436 | B2 | | 4/2003 | Ogi | |
| 6,588,440 | B2 | | 7/2003 | Varnado | |
| 6,609,332 | B1 | | 8/2003 | Nali | |
| 6,702,239 | B2 | | 3/2004 | Boucher | |
| 6,829,853 | B2 | * | 12/2004 | Kim | G09F 7/18 |
| | | | | | 40/607.14 |
| 6,843,022 | B1 | | 1/2005 | Holley | |
| 6,944,989 | B1 | | 9/2005 | Bradley | |
| 6,969,034 | B2 | | 11/2005 | Ware et al. | |
| 6,991,203 | B2 | | 1/2006 | Steadman | |
| 7,185,868 | B2 | | 3/2007 | Wang | |
| 7,237,980 | B2 | | 7/2007 | Fu | |
| 7,506,473 | B2 | | 3/2009 | Al-Qafas | |
| 7,681,355 | B2 | | 3/2010 | Brown et al. | |
| 8,132,361 | B1 | | 3/2012 | Poyas | |
| 8,226,057 | B2 | * | 7/2012 | Ao | H01Q 1/1228 |
| | | | | | 248/218.4 |
| 8,286,892 | B1 | | 10/2012 | Schwanebek | |
| 8,371,065 | B2 | | 2/2013 | Peterson | |
| 8,381,437 | B2 | | 2/2013 | Ciudaj | |
| 8,413,372 | B2 | | 4/2013 | King | |
| 8,500,141 | B2 | | 8/2013 | Chase | |
| 9,458,644 | B1 | | 10/2016 | Russell | |
| 2002/0073614 | A1 | | 6/2002 | Bayly et al. | |
| 2006/0150483 | A1 | | 7/2006 | Zayer | |
| 2010/0044463 | A1 | | 2/2010 | Walker et al. | |
| 2010/0051725 | A1 | | 3/2010 | Boyette et al. | |
| 2011/0016781 | A1 | | 1/2011 | Richardson | |
| 2012/0168535 | A1 | | 7/2012 | Chen | |
| 2013/0249206 | A1 | | 9/2013 | Chou | |
| 2014/0018626 | A1 | | 1/2014 | Lee | |
| 2014/0047766 | A1 | | 2/2014 | LaRue et al. | |
| 2014/0131544 | A1 | * | 5/2014 | Lupsa | H02G 3/12 |
| | | | | | 248/542 |
| 2020/0375121 | A1 | * | 12/2020 | Bortolussi | A01G 17/06 |
| 2021/0269292 | A1 | * | 9/2021 | Guo | B66F 3/10 |

FOREIGN PATENT DOCUMENTS

| ES | 2184605 | 4/2003 |
| WO | 9951079 A2 | 10/1999 |
| WO | 2008132749 A1 | 11/2008 |

* cited by examiner

1000

TREE STABILIZER AND A METHOD OF USING THE SAME

RELATED APPLICATIONS AND CLAIM FOR PRIORITY

This application is a continuation application of U.S. patent application Ser. No. 18/093,695 filed on Jan. 5, 2023 and titled "Tree Stabilizer and a Method of Using the Same" which is continuation-in-part (CIP) application of U.S. patent application Ser. No. 14/528,428 filed Oct. 30, 2014, and titled "Dual Plant Stake and Watering Apparatus"; which both applications are incorporated herein by its entirety and referenced thereto.

FIELD OF INVENTION

The present disclosure relates to a dual plant stake and watering apparatus, more specifically a plant stake and watering apparatus that may be hollow and may be capable of stabilizing the plant as well as applying water to the plant's roots.

BACKGROUND OF INVENTION

Typically, trees and shrubs are supported by a post embedded in the ground at a distance from the tree or shrub. The trees and shrubs are connected to the post using wires or cords tied around the post and running in horizontal orientation to the trunk of the tree or shrub.

Further, several other techniques have been used in the past to support the tree or shrub with the help of the post. One such example is disclosed in a Granted U.S. Pat. No. 7,681,355, entitled "Tree limb support device" ("the '355 patent"). The '355 patent discloses a device for supporting a tree limb. The device includes a base having top and bottom surfaces for situating the device proximate to said tree limb. A telescoping pole having a longitudinal axis and first and second ends is provided, the first end being rotatably secured to the base. A coupling is included for varying the length of the telescoping pole. A support rod is affixed to the second end of the telescoping pole, the support rod being rotatable about the longitudinal axis. A U-shaped limb support member is fixedly appended to the support rod.

Another example is disclosed in a Granted U.S. Pat. No. 6,702,239, entitled "Apparatus and method for supporting the trunk of a tree" ("the '239 patent"). The '239 patent discloses an adjustable-length shaft implanted in the ground for supporting trees. A helical screw is mounted on the lower end of the shaft. A lever arm, passed into a lever fitting attached to the shaft, is rotated about the shaft, causing the helical screw to penetrate and lodge in the ground. An anchoring bracket is attached to a portion of the shaft immediately above the ground. An anchoring rod is driven through the bracket into the ground, preventing further rotation of the shaft. A rigid fastening arm extends outwardly from the upper end of the shaft. The outer end of the fastening arm has a flexible strap with a free end. After adjusting and securing the shaft at the desired height, the free end of the strap is looped around the tree trunk and back through a ratchet mechanism in the fastening arm, which holds the free end fast.

Still, there is a need in the art for an improved tree stabilizer.

SUMMARY

The disclosure provides a dual plant stake and watering apparatus. In one preferred embodiment, the apparatus comprises a first hollow tubular member and a second hollow tubular member. The first and second tubular members comprise a first and second end, wherein at least one of the first and second ends of the first tubular member is adaptable to exist in an underground environment. The second tubular member may further comprise at least two orifices.

A first and second portion of an angular connector may be adapted to receive one of the first or second ends of the first tubular member and one of the first or second ends of the second tubular member. When the first or second ends of the first and second tubular members are displaced within portions of the angular connector, an angle is made between the first and second tubular members. In certain embodiments, the angle may roughly resemble a right angle. The angular connector may further comprise an open end that is adaptable to receive water from a water supply, such as, but not limited to a hose.

An inner tubular member comprising a distal end and a proximal end may be slidably disposed within the second tubular member in the axial direction of the second tubular member. Due to the placement of the inner tubular member, the inner tubular member may act as an "extension" of the second tubular member. The inner tubular member may further include at least two orifices. A first adjustable stabilizer may be disposed through the orifices of the inner tubular member and the second tubular member in order to restrict the axial movement of the inner tubular member.

A plant terminus may be supported by the proximal end of the inner tubular member. The plant terminus may be placed in a position adjacent to a plant trunk and may touch or not touch the plant trunk. The plant terminus comprises at least one orifice in order to allow for at least one second adjustable stabilizer to be disposed through the at least one orifice and around the plant trunk so as to keep the plant terminus and the plant trunk in close proximity. A purpose of the second adjustable stabilizer is to keep the plant trunk aligned.

In another aspect, the present invention discloses a tree stabilizer. The tree stabilizer includes a first tubular member and a second tubular member. The second tubular member positions perpendicularly to the first tubular member and includes a post receiving area. The tree stabilizer includes a third tubular member. The third tubular member has a smaller diameter than the first tubular members and is adapted to be inserted into the first tubular member. The tree stabilizer includes a plant terminus having a plant receiving section. The plant terminus connects at a distal end of the third tubular member. The plant terminus connects perpendicularly to the third tubular member. The post receiving area receives a post erected from ground at a suitable height. The third tubular member inserts into the first tubular member and adjusts the length of the tree stabilizer. The plant receiving section receives a tree. The tree stabilizer stabilizes the tree with the help of the post.

The first tubular member comprises first connecting holes. Further, the third tubular member comprises second connecting holes. The second connecting holes align with the first connecting holes. Further, the tree stabilizer includes a first tubular connecting member that draws through the first connecting holes and the third connecting holes and adjusts the length of the tree stabilizer. Additionally, the tree stabilizer includes a connecting member that connects to the plant terminus and receives the distal end of the third tubular member. The connecting member includes fourth connecting holes positioning perpendicularly to the third connecting holes on the third tubular member. The tree stabilizer includes a tree connecting member that draws through the fourth connecting holes and positions around the tree for connecting the tree to the plant terminus.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages that are included within this description, be within the scope of any claims filed later.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

It will be noted that throughout the appended drawings, like features are identified by like reference numerals.

DETAILED DESCRIPTION OF THE EMBODIMENTS

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

Figure 1:
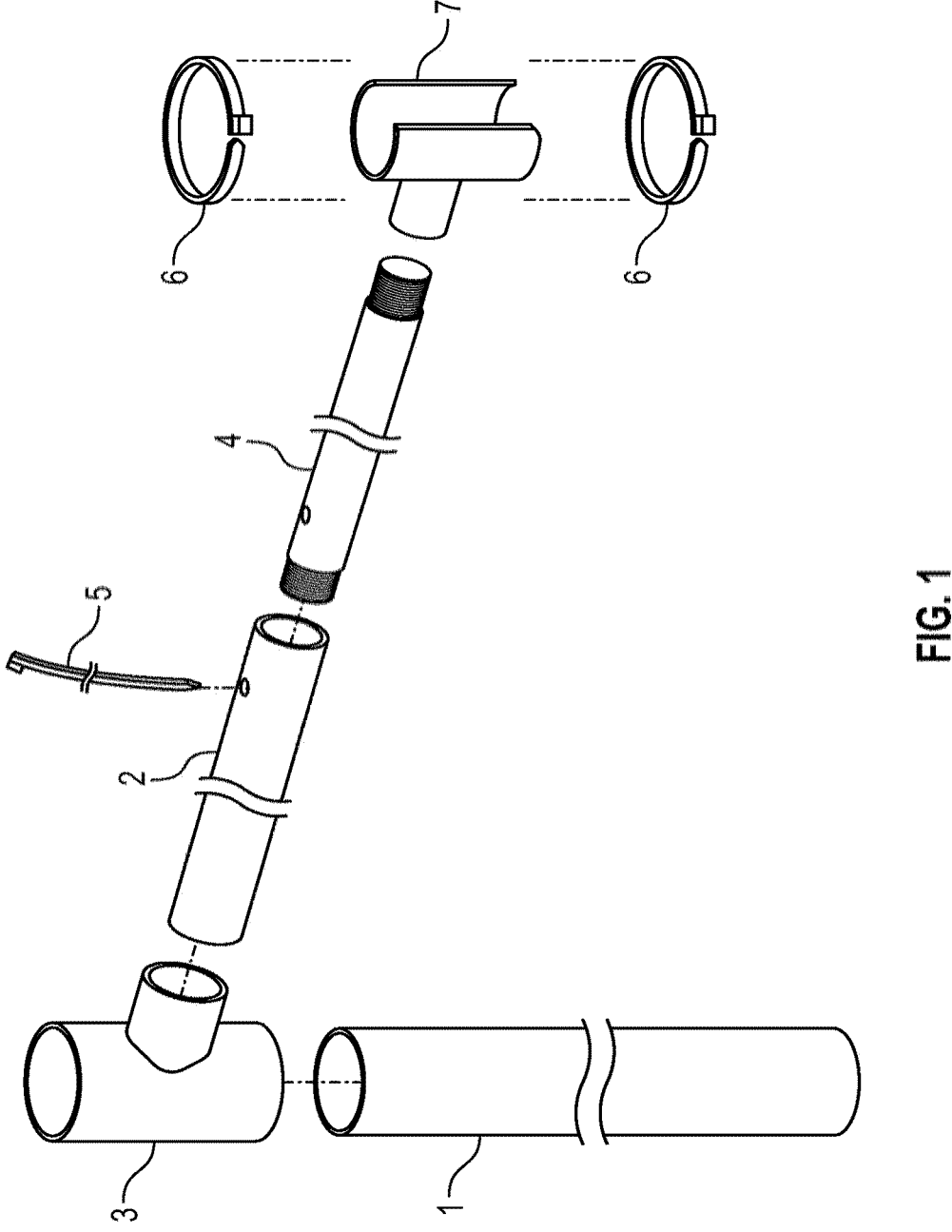
FIG. 1 illustrates an embodiment of a schematic diagram of the plant stake/watering apparatus.

FIG. 1 shows an embodiment of a schematic diagram of the plant stake/watering apparatus. The apparatus comprises seven main components: a first tubular member 1, a second tubular member 2, an angular connector 3, an inner tubular member 4, a first adjustable member 5, a second adjustable member 6, and a plant terminus 7.

The first tubular member 1 and second tubular member 2 are hollow and comprise first and second ends. The first tubular member 1 may be hollow in order to allow for a portion of the first tubular member 1 to be forced into the ground and to allow water from a water supply to flow through the hollow space and into the ground. The first tubular member 1 may be made of a material adaptable to exist in an underground environment, such as, but not limited to a metal or high density polymer. The second tubular member 2 may be hollow in order to allow for the inner tubular member 4 to be disposed within the hollow area. According to FIG. 1, the diameter of the first tubular member 1 is shown to be larger than the second tubular member 2. In other embodiments, the second tubular member 2 may be larger in diameter than the first tubular member 1 or the diameters of both first and second tubular members 1,2 may be the same. The second tubular member 2 may further comprise two orifices in order to allow for one of the adjustable members 5,6 to be disposed through the orifices.

In other embodiments, the second tubular member 2 may comprise more than two orifices in order to allow for one of the adjustable members 5,6 to be disposed in different configurations through the orifices or in order to allow for more than one of the adjustable members 5,6 to be disposed through the orifices.

First and second portions of an angular connector 3 may be adapted to receive one of the first or second ends of the first tubular member 1 and one of the first or second ends of the second tubular member 2. When the first or second ends of the first and second tubular members 1,2 are displaced within portions of the angular connector 3, an angle is made between the first and second tubular members 1,2. In certain embodiments, the angle may roughly resemble a right angle. In other embodiments, the angle may be an angle other than a right angle. The angular connector 3 may further comprise an open end that is adaptable to receive water from a water supply, such as, but not limited to a hose. In other embodiments, the first or second ends of the first and second tubular members 1,2 may screw into threads found on the interior of the angular connector 3. In other embodiments, a portion of the angular connector may be disposed within a portion of the first tubular member 1.

The inner tubular member 4 comprises a distal end and a proximal end. The inner tubular member 4 may be slidably disposed within the second tubular member 2 in the axial direction of the second tubular member 2. Due to the placement of the inner tubular member 4, the inner tubular member 4 may act as an "extension" of the second tubular member 2. The inner tubular member 4 may be made of a material so as to keep its integrity no matter how much of the inner tubular member 4 is disposed outside of the hollow section of the second tubular member 2. The inner tubular member 4 may further include at least two orifices. A first adjustable member 5 may be disposed through the orifices of the inner tubular member 4 and the second tubular member 2 in order to restrict the axial movement of the inner tubular member 4. In a certain embodiment, the orifices of each of the inner tubular member 4 and the second tubular member 2 may exist on opposite sides of the diameters of the inner tubular member 4 and the second tubular member 2, respectively. The first adjustable member 5 may then penetrate the orifices and wrap around a side of the second tubular member 2. It is preferred in most embodiments that the orifices found in the second tubular member 2 and the inner tubular member 4 may at least partially align in order to allow for the first adjustable member 5 to penetrate the orifices.

A plant terminus 7 may be supported by the proximal end of the inner tubular member 4. In a certain embodiment, a portion of the plant terminus 7 may screw into threads on the interior diameter of the inner tubular member 4. The plant terminus 7 may comprise a half semi cylindrical section that may be placed in a position adjacent to a plant trunk and may touch or may not touch the plant trunk. The plant terminus 7 may further comprise at least one orifice in order to allow for at least one second adjustable member 6 to be disposed through the at least one orifice and around the plant trunk so as to keep the plant terminus 7 and the plant trunk in close proximity. A purpose of the second adjustable member 6 is to keep the plant trunk aligned. In certain embodiments, the second adjustable member 6 may or may not cause the plant terminus 7 to touch the plant trunk.

Figure 2:
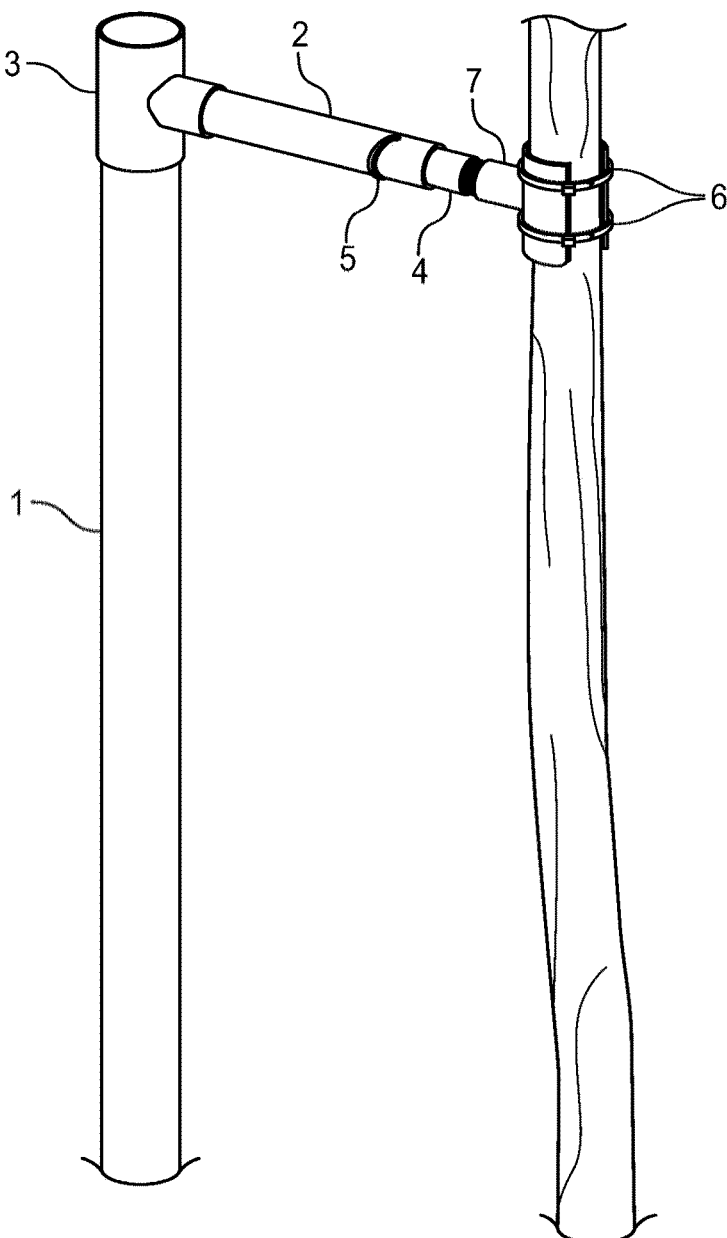
FIG. 2 illustrates an embodiment of the assembled plant stake/watering apparatus providing support to a plant.

FIG. 2 shows an embodiment of the assembled plant stake/watering apparatus providing support to a plant. The first tubular member 1 is shown with a portion of the first tubular member 1 being disposed in the ground, which is ideally where the roots of the plant may exist. The open section found on a side of the angular connector 3 allows for water to flow to the ground and subsequently penetrate the ground in order to reach the roots of a plant.

The angular connector can be seen engaging both the first tubular member 1 and second tubular member 2. Both tubular members make roughly a right angle in the embodiment shown in FIG. 2. A portion of the inner tubular member 4 may be found at the end of the second tubular member 2. This portion of the inner tubular member 4 is shown supporting the plant terminus 7, which is in close proximity with the plant and in engagement with the second adjustable stabilizer 6 to stay in close proximity with the plant. The assembled plant stake/watering embodies a simplistic structure that helps to stabilize plants.

Figures 3A, 3B:
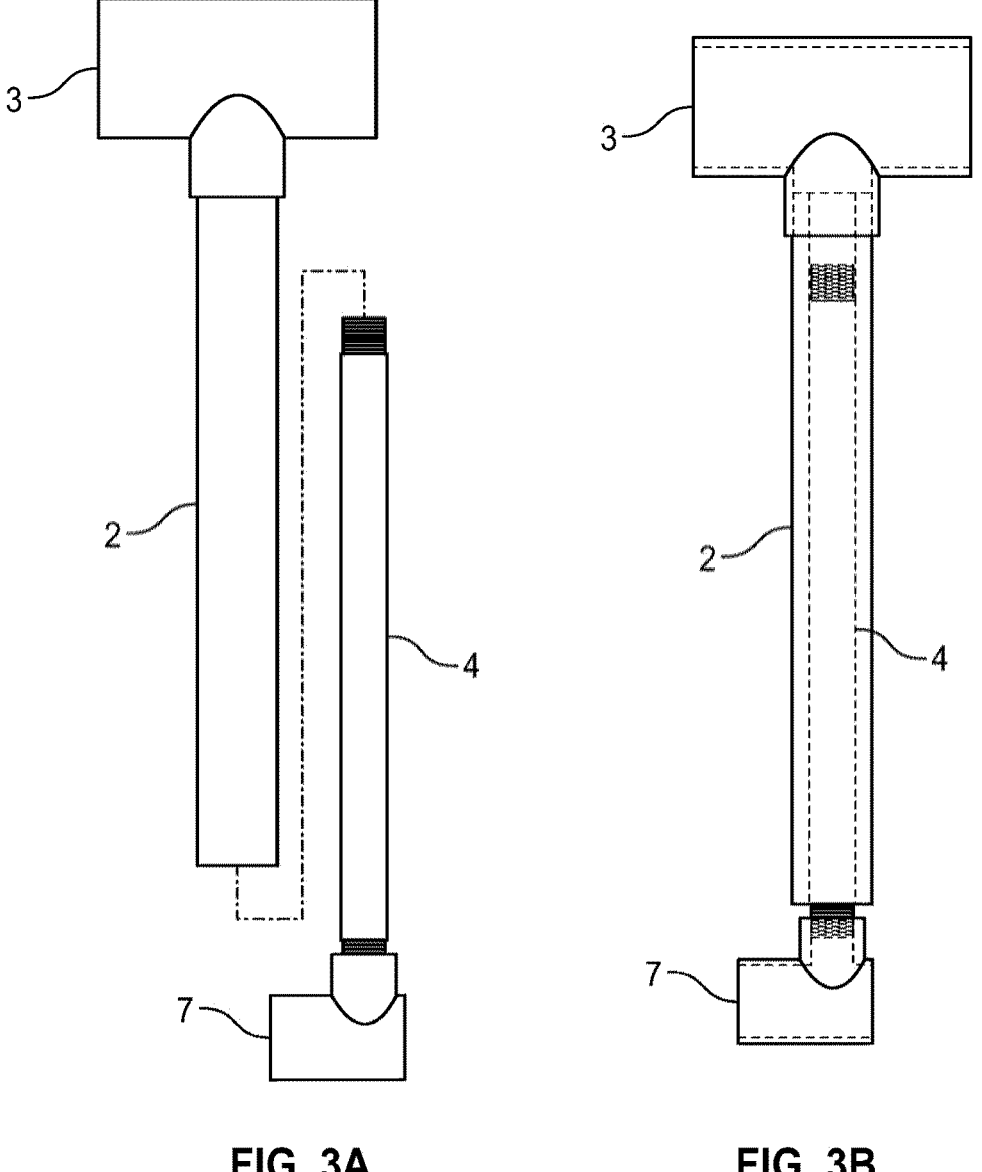
FIG. 3A illustrates an embodiment of a second tubular member/angular connector combination and inner tubular member/plant terminus combination.
FIG. 3B illustrates an embodiment of the inner tubular member/plant terminus combination being disposed of within the second tubular member/angular connector combination.

FIG. 3A shows an embodiment of a second tubular member 2/angular connector combination and inner tubular member 4/plant terminus 7 combination. The second tubular member 2 is shown attached to the angular connector 3. In certain embodiments, the second tubular member 2 is screwed into threads found within the angular connector 3, or vice versa. The inner tubular member 4 is shown attached to the plant terminus 7. In certain embodiments, the inner tubular member 4 is screwed into threads found within the plant terminus 7, or vice versa.

FIG. 3B shows an embodiment of the inner tubular member 4/plant terminus 7 combination being disposed of within the second tubular member 2/angular connector 3 combination. The outer diameter of the inner tubular member 4 may preferably be smaller than the interior diameter of the second tubular member 2. In certain embodiments, a portion of the angular connector 3 may be disposed within a portion of the second tubular member 2. In other embodiments, a portion of plant terminus 7 may be disposed within a portion of the inner tubular member 4.

In another embodiment, the inner tubular member 4 may comprise one or more orifices or indents that may penetrate one or more protrusions that may exist within the hollow section of the second tubular member 2. In order for the inner tubular member 4 to slide into the second tubular member 2, a section of the inner tubular member 4 may be shaped as an indentation of the shape of the one or more protrusions of the second tubular member 2 (this indentation may be continuous along a length of the inner tubular member 4. The one or more orifices or indents of the inner tubular member 4 may exist adjacent to the indentation section of the inner tubular member 4. When the inner tubular member 4 is placed into the second tubular member 2, the protrusions may exist within the indentation section of the inner tubular member 4. In order to secure the inner tubular member 4 within the second tubular member 2, the inner tubular member 4 may be twisted so that the one or more protrusions of the second tubular member 2 may move into the one or more orifices or indents of the inner tubular member 4. Similar securing means may be utilized between the first tubular member 1 and the angular connector 3, the second tubular member 2 and the angular connector 3, and/or the inner tubular member 4 and the plant terminus 7.

Figure 4A:
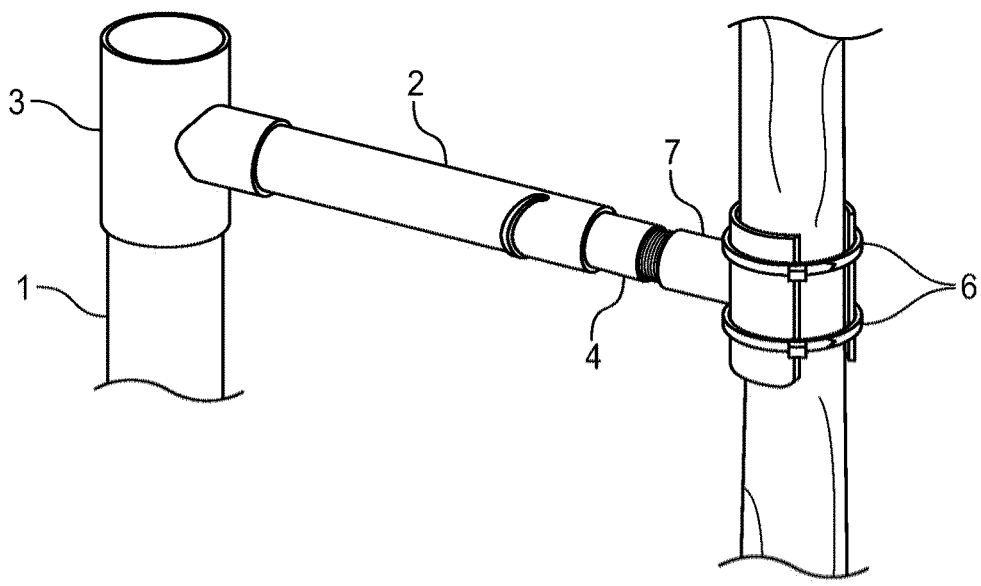
FIG. 4A illustrates an embodiment of the second tubular member and inner tubular member comprising orifices.

FIG. 4A shows an embodiment of the second tubular member 2 and inner tubular member 4 comprising orifices (the orifices of the inner tubular member 4 is not shown). The orifices may be created when the inner tubular member 4 is not disposed within the second tubular member 2 or when the inner tubular member 4 is disposed within the second tubular member 2. One way in which the orifices may be created is through the use of a drill.

Figure 4B:
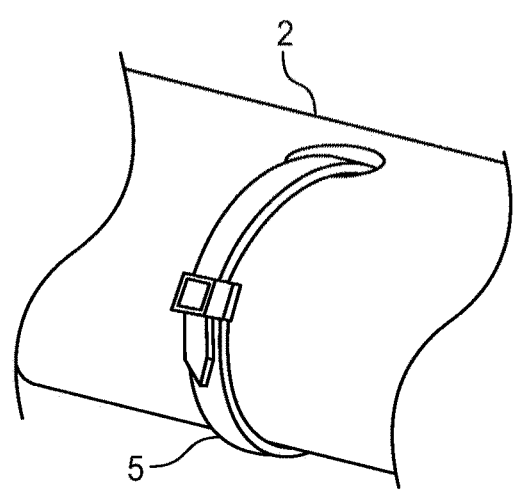
FIG. 4B illustrates an embodiment of the second tubular member with an adjustable member disposed through an orifice on the second tubular member.

A first adjustable member 5 may be disposed through the orifices of the inner tubular member 4 and the second tubular member 2 in order to restrict the axial movement of the inner tubular member 4, as shown in FIG. 4B. In a certain embodiment, the orifices of each of the inner tubular member 4 and the second tubular member 2 may exist on opposite sides of the diameters of the inner tubular member 4 and the second tubular member 2, respectively. The first adjustable member 5 may then penetrate the orifices and wrap around a side of the second tubular member 2 (as shown in FIG. 4B). It is preferred in most embodiments that the orifices found in the second tubular member 2 and the inner tubular member 4 may at least partially align in order to allow for the first adjustable member 5 to penetrate the orifices.

In another embodiment, the orifices of each of the inner tubular member 4 and the second tubular member 2 may separately exist adjacent to each other on the inner tubular member 4 and the second tubular member 2, respectively. The first adjustable member 5, in this case, may penetrate the orifices and loop through both the inner tubular member 4 and the second tubular member 2.

In another embodiment, the inner tubular member 4 may comprise one or more pressurized protrusions aligned in the axial direction of the second tubular member 2. The one or more pressurized protrusions may be adapted to penetrate one or more orifices of the second tubular member 2 in order to restrict movement of the inner tubular member 4. In certain embodiments, the one or more pressurized protrusions may be pressurized using one or more springs adapted to fit within the inner tubular member 4.

Figure 5:
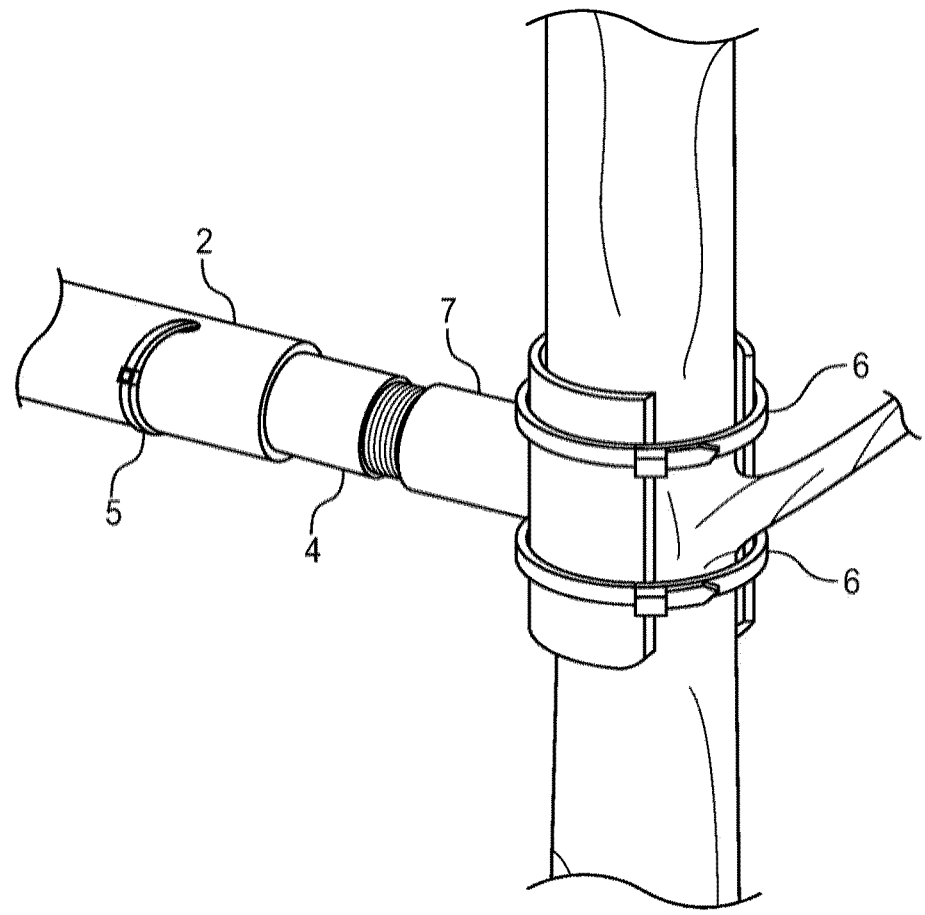
FIG. 5 illustrates an embodiment of the plant terminus existing adjacent a plant.

FIG. 5 shows an embodiment of the plant terminus 7 existing adjacent to a plant. The plant terminus 7 may approach a plant trunk at least one point. In certain embodiments, the point referred to may be the inner lowest point of the semi cylindrical section of the plant terminus 7. The plant terminus 7 may either be in contact with the plant at the above referenced point or at one or more points of the semi cylindrical section. In other embodiments, one or more of the points of the semi cylindrical section may not touch the plant trunk.

In certain embodiments, the length of the semi cylindrical section of the plant terminus 7 may span any length of a plant trunk. In other embodiments, a plant terminus 7 with a semi cylindrical section of any length may comprise more than two orifices. These embodiments may utilize a number of second adjustable members 6 sufficient to be disposed within some or all of the orifices. A plant terminus 7 with more than one orifice and more than one second adjustable stabilizer 6 may allow for better stabilization of a plant in certain instances.

In a further embodiment, the plant stake/watering apparatus may stabilize plants other than trees such as, but not limited to bushes and vines.

In a further embodiment, one or more of the first and/or second adjustable stabilizers may not be adjustable.

Certain embodiments of the current disclosure may provide elements of the dual plant stake/watering apparatus that may be adapted to fit and or mirror plants of various sizes. For example, if a tree has a diameter of 4 inches, the plant terminus 7 and second adjustable member 6 may be sized according to the 4 inch diameter so that both elements of the dual plant stake/watering apparatus may properly carry out their specific functions.

For the purposes of this disclosure, the terms adjustable stabilizer, adjustable member, and adjustable strap are synonymous.

Figure 6:
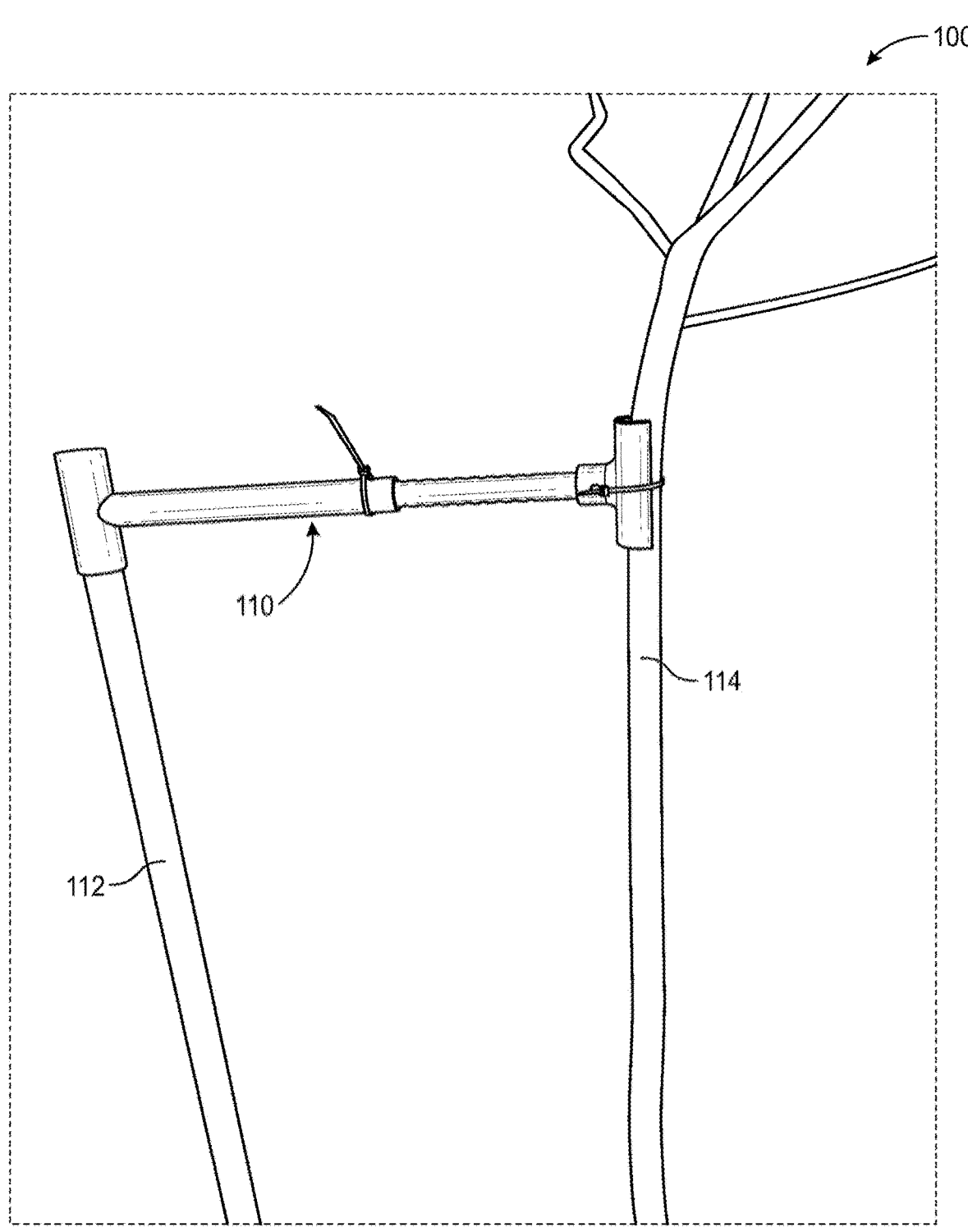
FIG. 6 illustrates an environment of a tree stabilizer, in accordance with one embodiment of the present invention.

FIG. 6 shows an environment 100 in which a tree stabilizer 110 implements, in accordance with one embodiment of the present invention. Tree stabilizer 110 mounts over a post 112 and helps to stabilize a tree or shrub or plant 114, as shown in FIG. 6, for example.

Figure 7A:
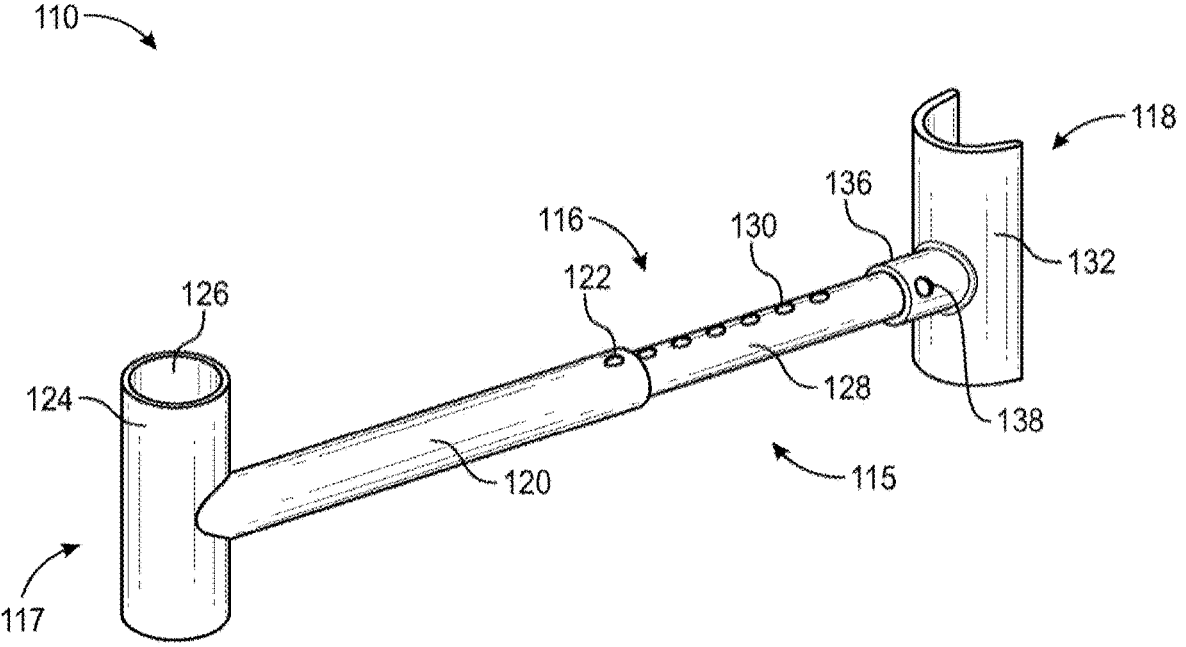
FIGS. 7A, 7B and 7C illustrate a perspective view, a side view and a top view, respectively of the tree stabilizer, in accordance with one embodiment of the present invention.
Figure 7B:
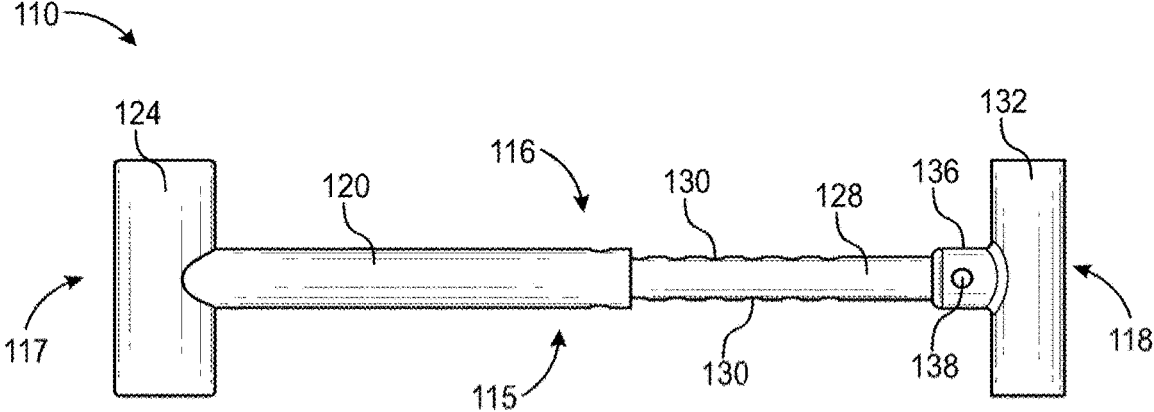
Figure 7C:
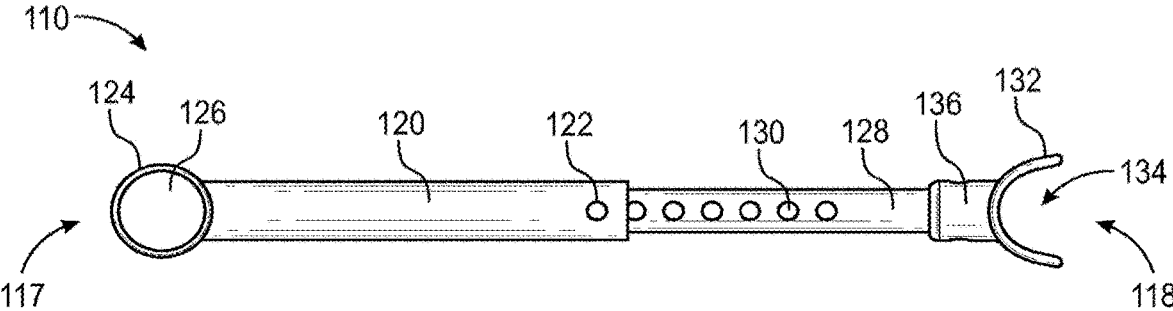

FIGS. 7A, 7B and 7C show a perspective view, a side view and a top view, respectively of tree stabilizer 110, in accordance with one embodiment of the present invention. Tree stabilizer 110 includes a bottom end 115, a top end 116, a first side 117 and a second side 118. Bottom end 115 indicates a bottom portion or bottom side of tree stabilizer 110. Top end 116 indicates a top portion or top side of tree stabilizer 110. First side 117 indicates a left side, and second side 118 indicates a right side, or vice versa of tree stabilizer 110.

In the present embodiment, tree stabilizer 110 includes a first tubular member 120. First tubular member 120 has a suitable diameter and length depending on the need. First tubular member 120 is made of metal, plastic, wood or any other suitable material. First tubular member 120 includes a hollow structure (not shown). At second side 118, first tubular member 120 includes first connecting holes 122. First connecting holes 122 are positioned at both bottom end 115 and top end 116, as shown in at least FIGS. 7A and 7C.

Further, tree stabilizer 110 includes a second tubular member 124. Second tubular member 124 is made of metal, plastic, wood or any other suitable material. Second tubular member 124 has a suitable diameter and length depending on the need. In the present embodiment, second tubular member 124 has the same or different diameter to that of first tubular member 120. In one example, second tubular member 124 comes as a separate component from first tubular member 120 and connects to first tubular member 120 using known mechanisms. Alternatively, second tubular member 124 integrates with first tubular member 120 and both come as a single component in a T-shaped configuration. As can be seen from at least FIGS. 7A and 7B, second tubular member 124 mounts perpendicularly to first tubular member 120

(T-shaped configuration). Further, second tubular member 124 includes a post receiving area 126. Post receiving area 126 indicates a hole or hollow portion formed in second tubular member 124 for receiving post 112, as shown in FIG. 6, for example.

Figure 8:
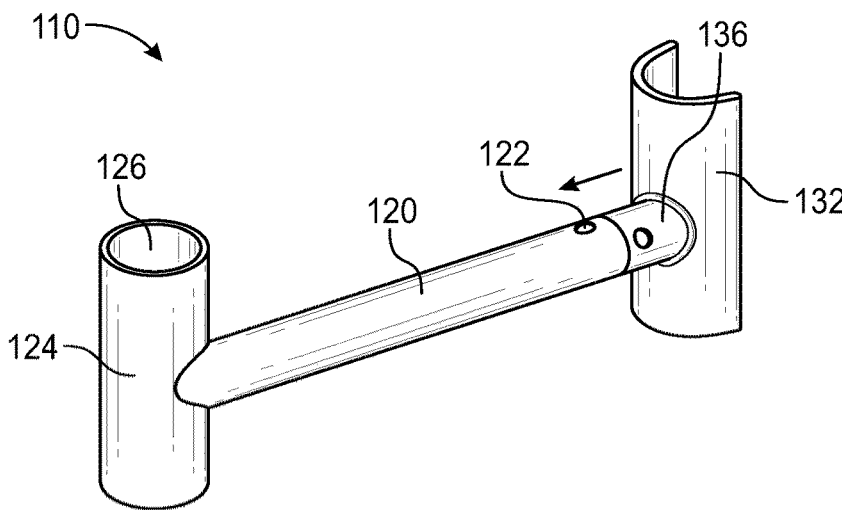
FIG. 8 illustrates a contracted tree stabilizer, in accordance with one embodiment of the present invention.

Tree stabilizer 110 includes a third tubular member 128. Third tubular member 128 is made of metal, plastic, wood or any other suitable material. Third tubular member 128 has a suitable diameter and length depending on the need. In the present embodiment, third tubular member 128 has a smaller diameter than first tubular member 120. As such, third tubular member 128 slides/inserts into and extends from first tubular member 120 and adjusts the length of tree stabilizer 110, as shown in FIGS. 8 and 7A, for example. Third tubular member 128 includes a plurality of third connecting holes 130 extending along the length of third tubular member 128. A person skilled in the art understands that any number of third connecting holes 130 can be provided at equal or varied distance from one another along the length of third tubular member 128 without departing from the scope of the present embodiment. Third connecting holes 130 are positioned at both bottom end 115 and top end 116, as shown in at least FIGS. 7A and 7C. Here, third connecting holes 130 align with first connecting hole 122 and help to connect first connecting hole 122 and third tubular member 128 at varied lengths.

Further, tree stabilizer 110 includes a plant terminus 132. Plant terminus 132 is made of metal, plastic, wood or any other suitable material. Plant terminus 132 mounts perpendicularly to first tubular member 120 and third tubular member 128, and substantially parallel to second tubular member 124. Plant terminus 132 comes in a semi-cylindrical fashion having a plant receiving section 134, as shown in at least FIGS. 7A and 7B. In other words, plant receiving section 134 indicates an opening formed at the semi-cylindrical portion of plant terminus 132. In one embodiment, plant terminus 132 is made of a flexible material. As such, plant terminus 132 expands thereby expanding plant receiving section 134 for connecting tree 114 of different shapes and diameter. In the present embodiment, plant terminus 132 connects to third tubular member 128 at second side 118 via a connecting member 136. In one example, plant terminus 132 comes as a separate component from connecting member 136 and connects to connecting member 136 using known mechanisms. Alternatively, plant terminus 132 integrates with connecting member 136 and both come as a single component in a T-shaped configuration. Connecting member 136 includes a third tubular receiving area (not shown) for receiving third tubular member 128. Further, connecting member 136 includes fourth connecting holes 138. Fourth connecting holes 138 position at substantially perpendicular to third connecting holes 130 on third tubular member 128, as can be seen from FIGS. 7A and 7B.

As specified above, third tubular member 128 has a smaller diameter than first tubular member 120. As such, third tubular member 128 inserts through first tubular member 120 and helps to reduce/adjust the length of tree stabilizer 110, as shown in FIG. 8, for example. If needed, third tubular member 128 is extended from first tubular member 120 thereby increasing the length of tree stabilizer 110, as shown in FIG. 6, for example.

Figure 9:
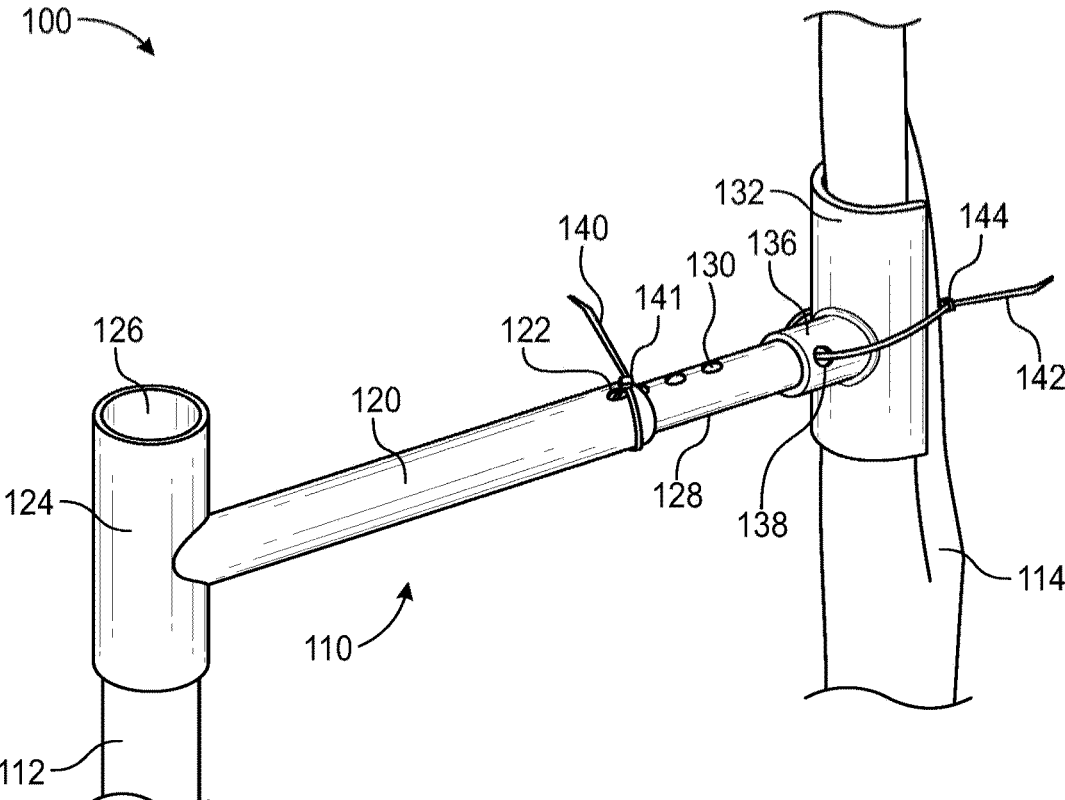
FIG. 9 illustrates the feature of the tree stabilizer connecting a tree, in accordance with one embodiment of the present invention.

FIG. 9 shows the operational feature of tree stabilizer 110, in accordance with one exemplary embodiment of the present invention. At first, post 112 is placed over the ground or connected to a structure depending on the need. Subsequently, second tubular member 124 is connected to post 112 by inserting post 112 through post receiving area 126.

Further, third tubular member 128 is inserted into first tubular member 120 depending on the distance required from post 112 to tree 114. Upon obtaining the desired length, a user (not shown) inserts a first tubular connecting member 140 through first connecting holes 122 and third connecting holes 130, as shown in FIG. 9. First tubular connecting member 140 indicates a first adjustable member or rope or cable or wire or cord that is made of suitable material. The user inserts first tubular connecting member 140 inserts first connecting holes 122 and third connecting holes 130 and ties a first knot 141 to lock the length of third tubular member 128 into first tubular member 120. Subsequently, the user aligns tree 114 with plant receiving section 134 and puts plant terminus 132 around tree 114. Further, the user draws a tree connecting member 142 through fourth connecting holes 138 and ties a second knot 144 around tree 114, as shown in FIG. 9. Tree connecting member 140 indicates a second adjustable member or rope or cable that is made of suitable material.

Tree stabilizer 110 is connected at a suitable height from the ground to provide required stability to tree 114. Tree stabilizer 110 retains the position of tree 114 in an upright position so that tree 114 does not bend and can grow in the upright position. The length of tree stabilizer 110 is adjustable. As a result, post 112 can be placed at a suitable distance from tree 114 and can be used to stabilize the position of tree 114. Tree stabilizer 110 can be connected from any side or angle to tree 114. As such, tree stabilizer 110 can be referred to as a complete tree stabilizer 110 or 360-degree tree stabilizer 110.

Figure 10:
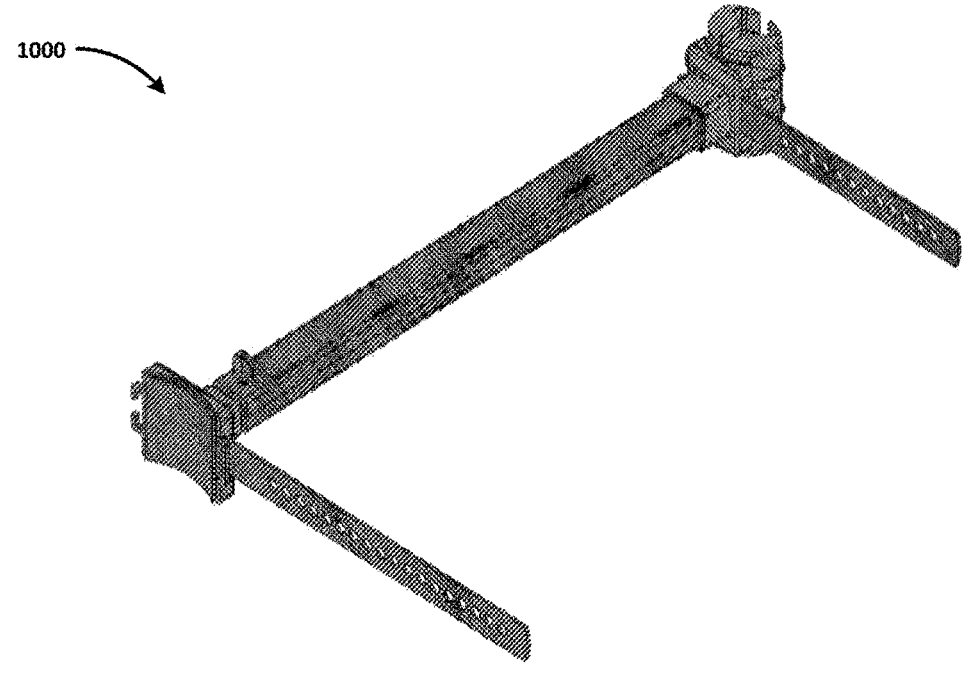
FIG. 10 illustrates an alternative tree stabilizer assembly of the present invention.
Figure 11:
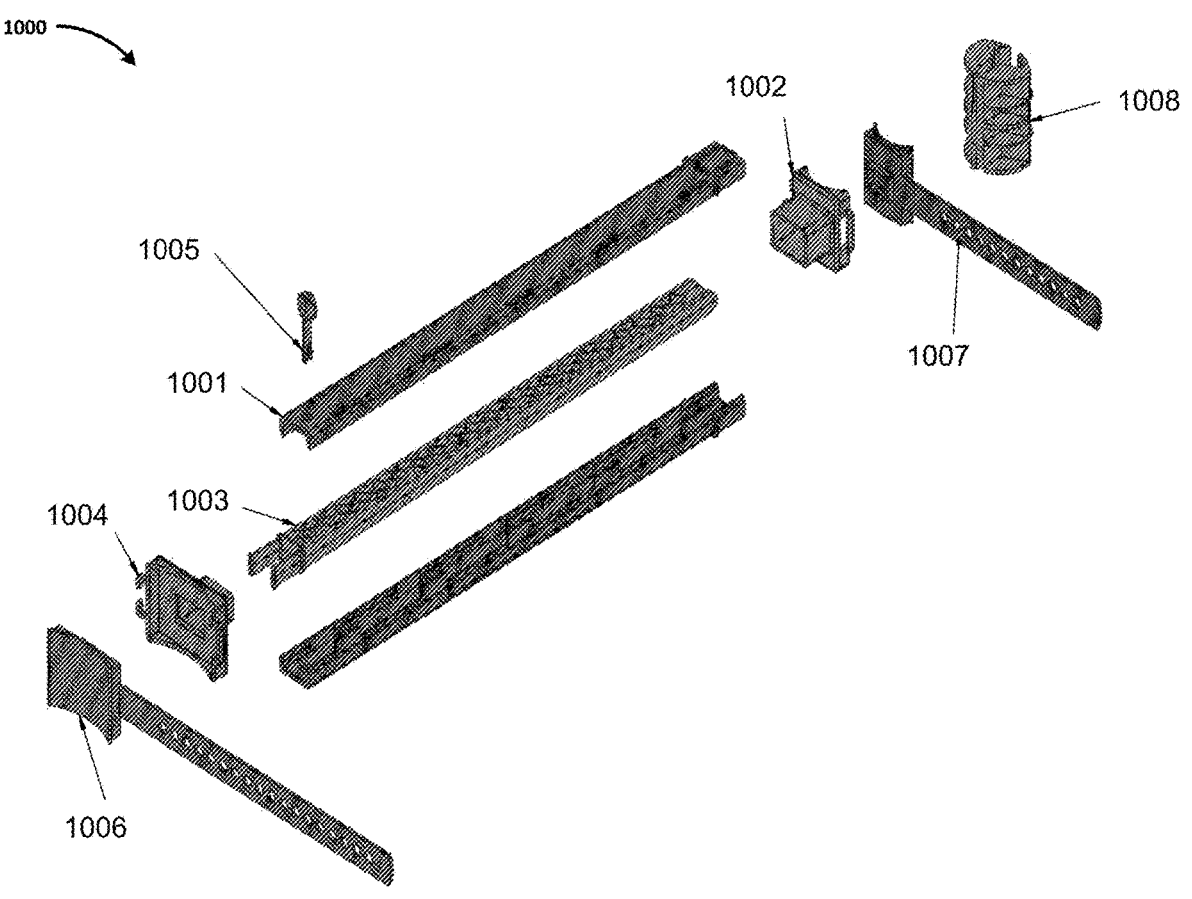
FIG. 11 depicts an alternative tree stabilizer assembly

FIGS. 10-11 shows an alternative tree stabilizer assembly 1000 of the present invention including a receiver tube 1001, a tube base 1002, a bar extension with holes 1003, a large strap base 1004, a snap-in pin 1005, a large strap 1006 for the tree base, a T-post strap 1007, and a T-post clamp 1008. The top portion of the receiver tube 1001 and the bottom portion of the receiver tube 1001 snap together to form the receiver tube 1001. The receiver tube 1001 is inserted and snapped into the tube base 1002. The T-post strap 1007 is passed through the tube base 1002. The bar extension 1003 is snapped into the large strap base 1004. The large strap 1006 is passed through the large strap base 1004. After this is completed, the bar extension 1003 is then slid into the receiver tube 1001. The bar extension 1003 then slides into the receiver tube 1001. This connection may, for example, be adjustably lengthened. The T-post adapter 1008 may, for example, be positioned on a T-Post. The T-post strap 1007 is configured to couple to the T-post adapter 1008.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure.

In the development of any actual implementation, numerous implementation-specific decisions must be made to achieve the developer's specific goals, such as compliance with system-related and business-related constraints. Such a development effort might be complex and time consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. The claimed invention set forth in the claims may not intended to be limited to the embodiments shown herein, but is to be accorded the widest scope consistent with the principles and novel features disclosed herein. It is contemplated that additional embodiments are within the spirit and true scope of the disclosed invention.

What is claimed is:

1. A tree stabilizer comprising:
a receiver tube extending along a longitudinal axis and configured to slidingly receive and couple to a bar extension with holes in a plurality of lengths along the longitudinal axis; and
a first terminal end coupled to the receiver tube and a second terminal end coupled to an opposing end of the bar extension, each of the first terminal end and second terminal end comprising:
a flexible member extending from the terminal end and configured to wrap around a respective vertical member and couple back to the terminal end such that the receiver tube and bar extension extend between and maintain a selected one of the plurality of lengths between the respective vertical members;
a strap base configured to receive the bar extension with holes and receive on an opposing strap base side a strap base configured to receive a tree base strap; and,
wherein the opposing strap base side is releasably coupled to the strap base.

2. The tree stabilizer of claim 1, wherein the receiver tube further comprises a first and second segment configured to enclose the bar extension with holes.

3. The tree stabilizer of claim 1, further comprising a tube base configured to receive the receiver tube and receive on a tube base opposing side a T-post strap configured to receive a T-post clamp.

4. The tree stabilizer of claim 1, further comprising a snap in pin configured to be received in an aperture located on the receiver tube to secure the bar extension in a fixed position and configured to affix the predetermined length of the bar extension.

5. The tree stabilizer of claim 1, wherein the opposing strap base side is fixedly attached to the strap base.

6. The tree stabilizer of claim 3, wherein the tube base opposing side is fixedly attached to the T-Post strap.

7. The tree stabilizer of claim 3, wherein the tube base opposing side is releasably coupled to the T-Post strap.

8. The tree stabilizer of claim 1, wherein the receiver tube is configured to adjustably enclose the bar extension with holes along a predetermined positioning along a longitudinal axis of the bar extension.

9. The tree stabilizer of claim 1, wherein the tube base further comprises a slot configured such that the T-post strap may extend from one side around a support structure on the opposite side and be received by an opposing slot.

10. The tree stabilizer of claim 1, wherein the tree base strap comprises multiple apertures extending along the tree base strap length.

11. The tree stabilizer of claim 3, wherein the tree strap base is configured to allow quick release of the strap for adjustments.

12. The tree stabilizer of claim 3, wherein the T-Post Clamp is configured to allow quick release of a T-post for adjustments.

13. The tree stabilizer of claim 1, wherein the bar extension includes a series of incremental markings for precise positioning along the receiver tube.

* * * * *